US012733052B2

(12) United States Patent
Dong

(10) Patent No.: US 12,733,052 B2
(45) Date of Patent: Sep. 8, 2026

(54) MULTI-LINK COMMUNICATION METHOD AND MULTI-LINK COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 321 days.

(21) Appl. No.: 18/292,668

(22) PCT Filed: Jul. 28, 2021

(86) PCT No.: PCT/CN2021/109054
§ 371 (c)(1),
(2) Date: Jan. 26, 2024

(87) PCT Pub. No.: WO2023/004644
PCT Pub. Date: Feb. 2, 2023

(65) Prior Publication Data
US 2024/0349372 A1 Oct. 17, 2024

(51) Int. Cl.
*H04W 76/15* (2018.01)
*H04W 76/11* (2018.01)

(52) U.S. Cl.
CPC ............ *H04W 76/15* (2018.02); *H04W 76/11* (2018.02)

(58) Field of Classification Search
None
See application file for complete search history.

(56) References Cited

U.S. PATENT DOCUMENTS 9,814,045 B2 * 11/2017 Kwon .................. H04W 76/14
12,526,755 B2 * 1/2026 Fischer ............ H04W 56/0005
2009/0196211 A1 * 8/2009 Wentink ........... H04W 52/0206 370/311
2011/0069689 A1 * 3/2011 Grandhi ............... H04W 76/23 709/205
2011/0188429 A1 8/2011 Seok
2012/0051240 A1 * 3/2012 Dwivedi .............. H04W 76/14 370/252
2014/0341148 A1 * 11/2014 Keskitalo ............. H04W 28/16 370/329
2016/0100443 A1 * 4/2016 Li ........................ H04W 8/005 370/338

(Continued)

FOREIGN PATENT DOCUMENTS

CN 106856587 A 6/2017

OTHER PUBLICATIONS

International Search Report mailed on Jan. 26, 2022 in PCT/CN2021/109054 filed on Jul. 28, 2021 (4 pages).

(Continued)

*Primary Examiner* — Jason D Cardone
(74) *Attorney, Agent, or Firm* — Oblon, McClelland, Maier & Neustadt, L.L.P.

(57) ABSTRACT

The multi-link communication method includes determining a first message frame on one link of multiple links, where the first message frame includes identification information for indicating that data is buffered for a device in a sleep state on at least one link of the multiple links, and a Tunneled Direct Link Setup (TDLS) function is supported on the at least one link; and sending the first message frame.

13 Claims, 2 Drawing Sheets

(56) References Cited

U.S. PATENT DOCUMENTS

| | | | | |
|---|---|---|---|---|
| 2020/0404691 | A1 * | 12/2020 | Wu | H04W 76/15 |
| 2021/0211871 | A1 | 7/2021 | Chu et al. | |
| 2023/0308938 | A1 * | 9/2023 | Sun | H04W 28/0278 |
| 2024/0244481 | A1 * | 7/2024 | Viger | H04W 28/0278 |
| 2025/0317997 | A1 * | 10/2025 | Huang | H04W 76/11 |
| 2025/0331045 | A1 * | 10/2025 | Lanante | H04L 5/0044 |

OTHER PUBLICATIONS

Abhishek, P.; Qualcomm Inc., "TDLS procedure in multi-link operation", IEEE 802.11-21/0240r8, Mar. 31, 2021 (Mar. 31, 2021), 7 pages.

IEEE Standard for Information Technology-Telecommunications and Information Exchange between Systems Local and Metropolitan Area Networks-Specific Requirements, IEEE Std 802.11ax-2021 (Amendment to IEEE Std 802.Nov. 2020), Amendment 1: Enhancements for High-Efficiency WLAN, 767 pages.

Draft Standard for Information technology—Tele-communications and information exchange between systems Local and metropolitan area networks-Specific requirements, IEEE P802.11be™/D1.0, 2021 (amendment to IEEE 802.11-2020) Amendment 8: Enhancements for extremely high throughput (EHT), 2021, 635 pages.

* cited by examiner

MULTI-LINK COMMUNICATION METHOD AND MULTI-LINK COMMUNICATION APPARATUS

CROSS REFERENCE TO RELATED APPLICATION(S)

The present application is a U.S. National Phase Stage application of International Application No. PCT/CN2021/109054 filed on Jul. 28, 2021, the content of which is incorporated herein by reference in its entirety for all purposes.

BACKGROUND

Technical Field

The present disclosure relates to the field of wireless communications, and more specifically, to a multi-link communication method and a multi-link communication apparatus.

Description of the Related Art

The current researches about Wi-Fi technology include 320 MHz bandwidth transmission, aggregation and coordination of multiple frequency bands, etc. It is expected to increase the rate and throughput by at least four times compared to the existing standards. The main application scenarios include video transmission, Augmented Reality (AR), Virtual Reality (VR), etc.

The aggregation and collaboration of multiple frequency bands means that devices communicate simultaneously in frequency bands such as 2.4 GHz, 5 GHZ, and 6 GHz. For the simultaneous communication between devices in multiple frequency bands, a new Media Access Control (MAC) mechanism needs to be defined for the ease of management. In addition, it is also expected that the aggregation and coordination of multiple frequency bands can support low-latency transmission.

The current multi-band aggregation and system technology may support a maximum bandwidth of 320 MHz (160 MHz+160 MHz), and may also support 240 MHz (160 MHz+80 MHz) and other bandwidths.

In the current technology, the station (STA) and the access point (AP) may be multi-link devices (MLD). That is, they support the ability to send and/or receive messages simultaneously on multiple links at the same time instance.

SUMMARY

Aspects of the present disclosure are aimed to address at least the above problems and/or disadvantages. Various embodiments of the present disclosure provide the following technical solutions.

An example embodiment according to the present disclosure provides a multi-link communication method, including: determining a first message frame on one link of multiple links; and sending the first message frame. The first message frame includes identification information for indicating that data is buffered for a device in a sleep state on at least one link of the multiple links. The Tunneled Direct Link Setup (TDLS) function is supported on the at least one link.

An example embodiment according to the present disclosure provides a multi-link communication method, including: receiving a first message frame on one link of multiple links; and performing a communication operation based on the first message frame. The first message frame includes identification information for indicating that data is buffered for a device in a sleep state on at least one link of the multiple links. The TDLS function is supported on the at least one link.

An example embodiment according to the present disclosure provides a multi-link communication apparatus, including: a processing module, configured to determine a first message frame on one link of multiple links, and a transceiving module, configured to send the first message frame. The first message frame includes identification information for indicating that data is buffered for a device in a sleep state on at least one link of the multiple links. The TDLS function is supported on the at least one link.

An example embodiment according to the present disclosure provides a multi-link communication apparatus, including a transceiving module, configured to receive a first message frame on one link of multiple links; and a processing module, configured to control execution of a communication operation based on the first message frame. The first message frame includes identification information for indicating that data is buffered for a device in a sleep state on at least one link of the multiple links. The TDLS function is supported on the at least one link.

An electronic device is provided according to an example embodiment of the present disclosure. The electronic device includes a memory, a processor, and a computer program stored on the memory and executable by the processor. The processor is configured to implement the multi-link communication method as described above when executing the computer program.

An example embodiment according to the present disclosure provides a computer-readable storage medium. A computer program is stored on the computer-readable storage medium. The computer program is configured to, when executed by the processor, implement the multi-link communication method described above.

The technical solution provided by the exemplary embodiments of the present disclosure helps to save signaling and power.

BRIEF DESCRIPTION OF THE DRAWINGS

The above and other features of embodiments of the present disclosure will be more apparent by describing in detail example embodiments of the present disclosure with reference to the accompanying drawings, in which.

DETAILED DESCRIPTION OF THE PREFERRED EMBODIMENTS

The following description with reference to the accompanying drawings is provided to assist in a comprehensive understanding of various embodiments of the present disclosure as defined by the appended claims and their equivalents. Various embodiments of the present disclosure include various specific details, but these specific details are considered to be exemplary only. Additionally, descriptions of well-known techniques, functions, and constructions may be omitted for the sake of clarity and conciseness.

The terms and words used in the present disclosure are not limited to the written meanings, and are merely used by the inventor(s) to enable a clear and consistent understanding of the present disclosure. Accordingly, to those skilled in the art, the description of various embodiments of the present disclosure is provided for illustration purpose only and not for the purpose of limitation.

It will be understood that, as used herein, the singular forms "a," "an," "the", and "said" may include the plural forms as well, unless the context clearly dictates otherwise. It should be further understood that the word "comprising" as used in the present disclosure refers to the presence of the described features, integers, steps, operations, elements and/or components, but does not exclude the presence or addition of one or more other features, integers, steps, operations, elements, components, and/or combinations thereof.

It will be understood that, although the terms "first," "second," etc. may be used herein to describe various elements, these elements should not be limited by these terms. These terms are only used to distinguish one element from another. Accordingly, a first element discussed below may be termed a second element, without departing from the teachings of example embodiments.

It will be understood that when an element is referred to as being "connected" or "coupled" to another element, it may be directly connected or coupled to the other element or intervening elements may also be present. Additionally, the wording of "connected" or "coupled" as used herein may include a wireless connection or a wireless coupling. As used herein, the term "and/or" or the expression "at least one/at least one of" includes any and all combinations of one or more of the associated items as listed.

Unless otherwise defined, all terms (including technical and scientific terms) used herein have the same meaning as commonly understood by one of ordinary skill in the art to which the present disclosure belongs.

Figure 1:
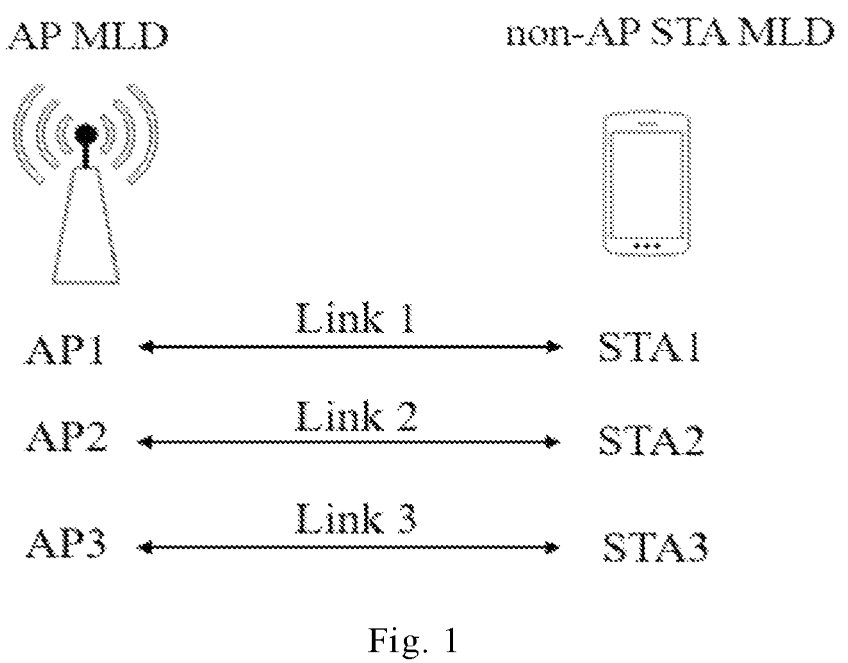
FIG. 1 is an exemplary diagram illustrating a multi-link communication scenario according to an embodiment.

FIG. 1 is an exemplary diagram illustrating a multi-link communication scenario according to an embodiment.

In a wireless Local Area Network (LAN), a Basic Service Set (BSS) may consist of an Access Point (AP) and one or more stations (STAs) that communicate with the AP. The basic service set may be connected to the Distribution System (DS) through its AP, and then connected to another basic service set to form an Extended Service Set (ESS).

AP is a wireless switch used in wireless networks, and is also the access device of wireless networks. AP device may be used as a wireless base station, and mainly as a bridge for connecting wireless networks and wired networks. Using the access point AP, wired and wireless networks may be integrated.

AP may include software applications and/or circuits to enable other types of nodes in the wireless network to communicate through the AP both outside and within the wireless network. In some examples, as an example, AP may be a terminal device or a network device equipped with a Wireless Fidelity (Wi-Fi) chip.

By way of example, the station (STA) may include, but is not limited to, cellular phone, smartphone, wearable device, computer, Personal Digital Assistant (PDA), Personal Communication System (PCS) device, Personal Information Manager (PIM), Personal Navigation Device (PND), Global Positioning System (GPS), multimedia device, Internet of Things (IoT) device, etc.

In example embodiments of the present disclosure, AP and STA may support Multi-Link Devices (MLD), and for example, may be denoted as AP MLD and non-AP STA MLD respectively. For the ease of description, in the following, an example in which one AP communicates with one STA on multiple links is mainly described. However, example embodiments of the present disclosure are not limited thereto.

In FIG. 1, for example only, AP MLD may represent an access point that supports multi-link communication functions, and non-AP STA MLD may represent a station that supports multi-link communication functions. Referring to FIG. 1, AP MLD may work on three links, such as the affiliated AP1, AP2, and AP3 as shown in FIG. 1. Non-AP STA MLD may also work on three links, such as the affiliated STA1, STA2, and STA3 as shown in FIG. 1. In the example of FIG. 1, it is assumed that AP1 and STA1 communicate through the respective first link Link 1. Similarly, AP2 communicates with STA2 through the second link Link 2, and AP3 communicates with STA3 through the third link Link 3. In addition, Link 1 to Link 3 may be multiple links at different frequencies. For example, they may be links at 2.4 GHz, 5 GHZ, 6 GHZ, etc. Alternatively, Link 1 to Link 3 may be several links with the same bandwidth or different bandwidths at 2.4 GHz, 5 GHZ, and 6 GHz. Additionally, multiple channels may exist on each link. However, it should be understood that the communication scenario shown in FIG. 1 is only exemplary, and the inventive concept is not limited thereto. For example, AP MLD may be connected to multiple non-AP STA MLDs. Alternatively, on each link, AP may communicate with a plurality of other types of stations.

Figure 2:
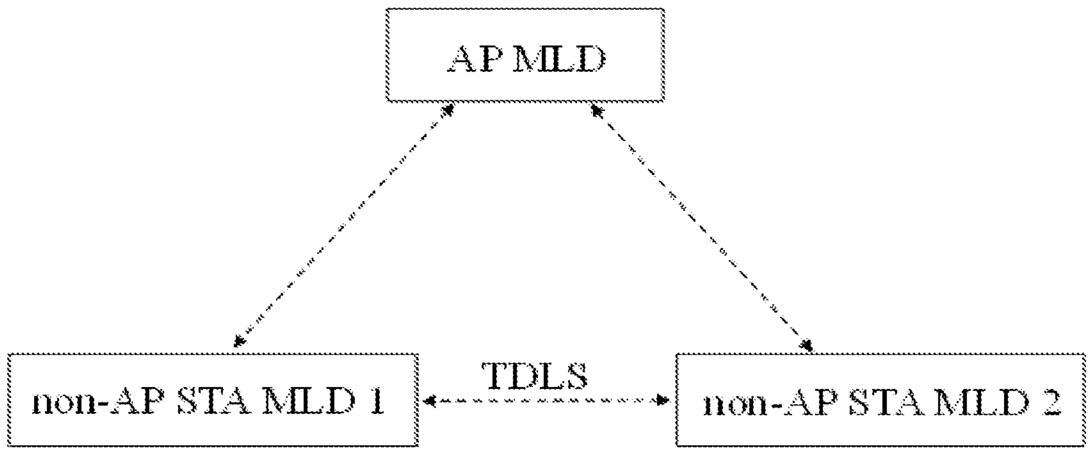
FIG. 2 is an exemplary diagram illustrating tunneled direct link setup (TDLS) according to an embodiment.

In order to improve the transmission efficiency, non-AP STA MLD may support the Tunneled Direct Link Setup (TDLS) function. As shown in FIG. 2, an exemplary diagram of the Tunneled Direct Link Setup (TDLS) is shown according to an embodiment.

Referring to FIG. 2, the Tunneled Direct Link Setup (TDLS) may be implemented between the first multi-link station device non-AP STA MLD 1 and the second multi-link station device non-AP STA MLD 2, so that the direct communication between them (for example, data transmission) is achieved without going through the multi-link Access Point device AP MLD. It will be understood that although as shown in FIG. 2, the first multi-link station device non-AP STA MLD 1 and the second multi-link station device non-AP STA MLD 2 are both connected to the same multi-link Access Point device AP MLD, but the present disclosure is not limited thereto. For example, non-AP STA MLD 1 and non-AP STA MLD 2 may be connected to different AP MLDs respectively.

One of the first multi-link station device non-AP STA MLD 1 and the second multi-link station device non-AP STA MLD 2 may serve as a TDLS initiator to initiate a TDLS discovery request, and the other one may serve as a TDLS responder to provide a TDLS discovery response. Then, a tunneled direct link is setup between them through the TDLS setup process. For example, the TDLS setup process may include TDLS setup request, TDLS setup response, and TDLS setup confirm.

For two stations (STAs) that have setup a TDLS link, the following situation may exist, where one station is in a power saving mode after completing communication (for example, setting the frame PM to "1"), while data is buffered for the other station. The existing technology lacks an operation mechanism suitable for the above situations about the TDLS communication in a multi-link communication environment.

Figure 3:
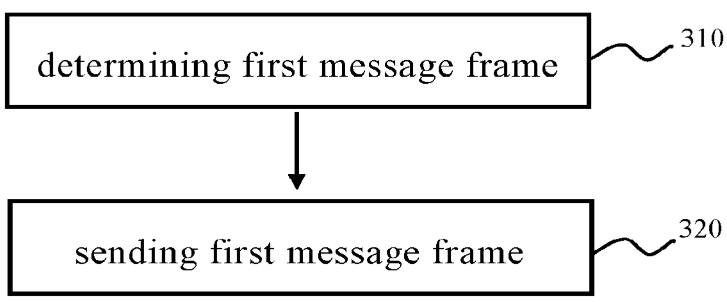
FIG. 3 is a flowchart illustrating a multi-link communication method according to an embodiment.

FIG. 3 is a flowchart illustrating a multi-link communication method according to an embodiment. The communication method shown in FIG. 3 may be applied to a sender, for example, a station that buffers data for a device in a sleep state (such as a receiver).

Referring to FIG. 3, in step 310, a first message frame is determined on one link of multiple links. According to an embodiment of the present disclosure, the first message frame may include identification information indicating that data is buffered for a device in a sleep state on at least one link of the multiple links. The at least one link supports the Tunneled Direct Link Setup (TDLS) function.

In embodiments of the present disclosure, multiple links may refer to those that the sender can support for communicating on different frequency bands (for example, Link 1, Link 2, and Link 3 in FIG. 1). In another embodiment, multiple links may refer to multiple TDLS links for the sender. In addition, as a descriptive example only, the first message frame may be a TDLS Peer Traffic Indication frame. However, the present disclosure is not limited thereto, and other frames capable of realizing TDLS communication are also feasible.

In embodiments of the present disclosure, there may be many ways to determine the first message frame. For example, the first message frame may be generated according to at least one of the following: network condition, load condition, hardware capability of sending/receiving device, traffic category, and relevant protocol provision. The embodiments of the present disclosure do not impose specific restrictions in this regard. In an embodiment of the present disclosure, the first message frame may also be obtained from an external device, and the embodiments of the present disclosure do not impose any specific limitations in this regard.

With the identification information carried in the first message frame, the situation where data that is buffered on other links and/or its own link (i.e., at least one link) can be identified on one link, thereby saving signaling overhead and enabling the buffered data to be transmitted to the receiving end in time.

According to an embodiment of the present disclosure, the identification information may include a Peer Traffic Indication (PTI) information element, which may have the format shown in Table 1 below.

According to an embodiment of the present disclosure, the PTI information element may include: a basic service set identifier or link identification corresponding to each link of at least one TDLS link (for example, BSSID1/Link ID1, BSSID2/Link ID3 in Table 1), a transmission identifier (for example, TID1, TID2 in Table 1), and sequence number control information (for example, Sequence Control 1, Sequence Control 2 in Table 1).

Each Basic Service Set Identifier (BSSID) may indicate the identifier of the Basic Service Set (BSS) to which the access point on the respective link belongs. The Basic Service Set Identifier BSSID may be the BSSID of the AP associated with the sender on the respective link. Referring to FIG. 1, if the TDLS function is implemented on Link 1 and Link 2, and the senders corresponding to Link 1 and Link 2 respectively buffer data for their respective receivers in the sleep state, then BSSID1 and BSSID2 may indicate the basic service set identifier of the access point AP1 on Link 1, and the basic service set identifier of the access point AP2 on Link 2. The respective link can be located through the basic service set identifier. That is, it can be located on which link the buffered data exists.

The link identification (Link ID) may have multiple bits to identify the combination information of the operation spectrum, bandwidth/channel, and/or BSSID. At least one TDLS link may be identified by carrying at least one link identification (Link ID1, Link ID2). Referring to FIG. 1, if the TDLS function is implemented on Link 1 and Link 2, and the senders corresponding to Link 1 and Link 2 respectively buffer data for their respective receivers in the sleep state, then Link ID1 and Link ID2 may respectively identify the combination information of the operation spectrum, bandwidth/channel, and/or BSSID of Link 1 and Link 2.

A Transport Identifier (TID) may indicate the traffic buffered for the device in the sleep state on the respective link. For example, the TID may be set to the TID of the most recent MAC Protocol Data Unit (MPDU) sent over the TDLS link to the device in the sleep state. According to embodiments of the present disclosure, the TID may be mapped to a respective basic service set identifier or link identification, and identify that the traffic transmission of the respective TID is performed on the link that is identified by the mapped basic service set identifier or link identification. That is, as shown in Table 1, TID1 is mapped to BSSID1/Link ID1, and TID2 is mapped to BSSID2/Link ID2.

TABLE 1

| PTI information element | | | | | | | | |
|---|---|---|---|---|---|---|---|---|
| Element ID | Length | TID1 | Sequence Control 1 | BSSID1/Link ID1 | TID2 | Sequence Control 2 | BSSID2/Link ID2 | . . . |

Referring to Table 1, the PTI information element may include: element identification (Element ID) that identifies the PTI information element, a length field (Length) that represents the length information of the PTI information element, and information corresponding to at least one link in which data is buffered. For the convenience of description below, the at least one link may be referred to as at least one TDLS link. Although information corresponding to two TDLS links is shown in Table 1, the present disclosure is not limited thereto, and the information in Table 1 may be changed differently according to actual operation conditions.

The sequence number control information (Sequence Control) may be set to the sequence number of the most recent MPDU sent to the device in the sleep state through the TDLS link.

Although examples of the PTI information element are shown in Table 1, the present disclosure is not limited thereto, and some contents in the PTI information element may be omitted or more other contents may be included.

According to an embodiment of the present disclosure, the identification information may include the Tunneled Direct Link Setup (TDLS) Peer Unscheduled-Automatic Power Save Delivery (U-APSD) [TDLS Peer U-APSD (TPU)] information element, which may have the format shown in Table 2 below.

TABLE 2

| TPU information element format | | | | | | |
|---|---|---|---|---|---|---|
| Element ID | Length | TPU buffer status information 1 | BSSID1/Link ID1 | TPU buffer status information 2 | BSSID2/Link ID2 | . . . |

Referring to Table 2, the TPU information element may include: element identification (Element ID) that identifies the TPU information element, a length field (Length) that represents the length information of the TPU information element, and information corresponding to at least one TDLS link that buffers data. Although information corresponding to two TDLS links is shown in Table 2, the present disclosure is not limited thereto, and the information in Table 2 may be changed differently according to actual operation conditions.

According to an embodiment of the present disclosure, the TPU information element may include: a basic service set identifier or link identification corresponding to each link of at least one TDLS link (for example, BSSID1/Link ID1, BSSID2/Link ID3 in Table 2), and TPU buffer status information (for example, TPU buffer status information 1, TPU buffer status information 2 in Table 2).

The basic service set identifier or link identification (BSSID/Link ID) may be similar to the embodiment described above with reference to Table 1, and repeated descriptions are omitted here to avoid redundancy.

The TPU buffer status information may indicate the buffer statuses of traffics of different access categories on the respective link. The TPU buffer status information may carry the traffic buffer status of the queue of different access categories on the respective link. For example, as a descriptive example only, each TPU buffer status information (TPU buffer status information 1, TPU buffer status information 2) in Table 2 may have a format as shown in Table 3 below.

TABLE 3

| TPU buffer status information format | | | | |
|---|---|---|---|---|
| AC_BK traffic available | AC_BE traffic available | AC_VI traffic available | AC_VO traffic available | Reserved |

In Table 3, AC_BK (Background traffic), AC_BE (Best Effort traffic), AC_VI (Video traffic), and AC_VO (Voice Traffic) may identify four Access Categories (ACs). In the Enhanced Distributed Channel Access (EDCA) mechanism of the MAC layer, the priorities of different traffic applications can be distinguished, and the channel access capability of high-priority traffics can be guaranteed. AC_BK, AC_BE, AC_VI, and AC_VO may be configured with different EDCA parameters respectively, so that the high-priority AC queue has more sending occasions and less waiting time.

According to embodiments of the present disclosure, the TPU buffer status information may identify the buffer statuses of AC_BK, AC_BE, AC_VI, and AC_VO on each link.

For example, the AC_BK traffic available field may be set to a specific value (such as, but not limited to, 1), if AC_BK contains buffered traffic for a device in a sleep state on the respective link; and otherwise, it is set to another specific value (such as, but not limited to, 0). If AC_BE contains buffered traffic for a device in a sleep state on the respective link, the AC_BE traffic available field may be set to a specific value (such as, but not limited to, 1); and otherwise, it is set to another specific value (such as, but not limited to, 0). If AC_VI contains buffered traffic for a device in a sleep state on the respective link, the AC_VI traffic available field may be set to a specific value (such as, but not limited to, 1); and otherwise, it is set to another specific value (such as, but not limited to, 0). If AC_VO contains buffered traffic for a device in a sleep state on the respective link, the AC_VO traffic available field may be set to a specific value (such as, but not limited to, 1); and otherwise, it is set to another specific value (such as, but not limited to, 0).

In addition, it can be understood that each element shown in Tables 1 to 3 exists independently. These elements are exemplarily listed in the same table, but this does not mean that all elements in the table must exist based on that shown in the table. Therefore, those skilled in the art can understand that the value of each element in the disclosed table is an independent embodiment.

With continued reference to FIG. 3, in step 320, a first message frame may be sent. For example, the first message frame may be sent on the link in which the first message frame is determined in step 310. However, the present disclosure is not limited thereto. The first message frame may be sent on other links different from the link in which the first message frame is determined in step 310. In one embodiment of the present disclosure, the first message frame may be sent directly from the sender to the receiver. In another embodiment of the present disclosure, the first message frame may be sent to the receiver via the access point.

With the identification information described with reference to Tables 1 to 3 being carried in the first message frame, the case where data that is buffered on other links and/or its own link (i.e., at least one link) can be identified on one link, without sending information about the buffered data on each link, thereby saving signaling overhead and allowing buffered data to be transmitted to the receiving end in a timely manner.

The flowchart of the communication method shown in FIG. 3 is only provided as an example, and the present disclosure is not limited thereto. For example, according to an embodiment of the present disclosure, the communication method described in FIG. 3 may further include: sending a second message frame; and/or receiving a third message frame. At least one of the second message frame and the third message frame includes information identifying support for a multi-link communication.

For example, in the case where the sender performing the communication method described in FIG. 3 is a TDLS initiator, the communication method described in FIG. 3 may include sending a second message frame. As a descriptive example only, the second message frame may be a TDLS discovery request frame. In one embodiment, the information identifying support for a multi-link communication may be carried in the second message frame (TDLS discovery request frame) in an explicit manner. For example, the multi-link communication identification bit may be set in the second message frame (TDLS discovery request frame). When the identification bit is set to a specific value, it may be identified that multi-link communication is supported. In another embodiment, the information indicating support for a multi-link communication may be carried in the second message frame (TDLS discovery request frame) in an implicit manner. For example, when the second message frame (TDLS discovery request frame) includes a multi-link information element, or there is information about multiple TDLS links in the link identifier information element of the second message frame, support for a multi-link communication may be implicitly identified.

For example, in the case where the sender performing the communication method described in FIG. 3 is a TDLS initiator, the communication method described in FIG. 3 may include receiving a third message frame. As a descriptive example only, the third message frame may be a TDLS discovery response frame. The information identifying support for a multi-link communication may be carried in the third message frame (TDLS discovery response frame) in an explicit or implicit manner.

For example, in the case where the sender performing the communication method described in FIG. 3 is a TDLS responder, the communication method described in FIG. 3 may include sending a second message frame. As a descriptive example only, the second message frame may be a TDLS discovery response frame. In one embodiment, the information identifying support for a multi-link communication may be carried in the second message frame (TDLS discovery response frame) in an explicit or implicit manner.

For example, in the case where the sender performing the communication method described in FIG. 3 is a TDLS responder, the communication method described in FIG. 3 may include receiving a third message frame. As a descriptive example only, the third message frame may be a TDLS discovery request frame. In one embodiment, the information identifying support for a multi-link communication may be carried in the third message frame (TDLS discovery request frame) in an explicit or implicit manner.

In embodiments of the present disclosure, the non-AP STA MLD may setup multiple links after or during the TDLS process. For example, the non-AP STA MLD may identify in the TDLS discovery request frame or the TDLS discovery response frame that it supports a multi-link communication (for example, supports the implementation of TDLS communication on multiple links), and identifies multiple links that need to be setup (for example, Link IDs of the multiple TDLS links that need to be setup). After identifying that a multi-link communication is supported, in the TDLS setup process (for example, TDLS setup request, TDLS setup response, and TDLS setup confirmation) as described with reference to FIG. 2, multiple TDLS links are setup. According to an embodiment of the present disclosure, steps 310 and 320 of FIG. 3 may be applied to the multiple TDLS links as setup. That is, the data buffered on one or more link may be identified on one link.

The sender performing the communication method described in FIG. 3 may acquire the information about support for a multi-link communication from the second message frame and/or the third message frame, thereby determining that the first message frame on one link includes identification information for indicating the data buffered on one or more link, so as to effectively save signaling overhead and enable the buffered data to be transmitted to the receiving end in a timely manner.

Figure 4:
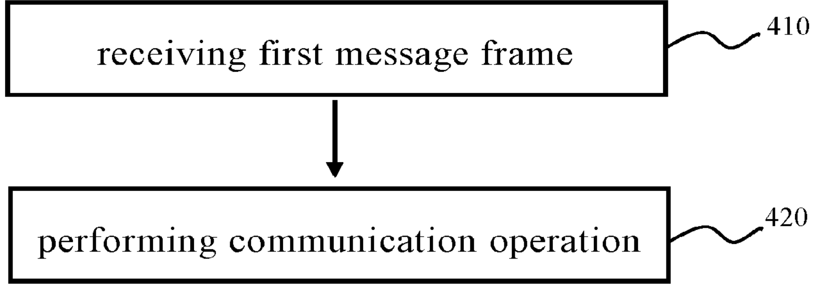
FIG. 4 shows a flowchart illustrating another multi-link communication method according to an embodiment.

FIG. 4 shows a flowchart of another multi-link communication method according to an embodiment. The communication method shown in FIG. 4 may be applied to the receiver. In one embodiment, the receiver may be a device (station) in a sleep state. In this case, the station that setups TDLS with the sender may directly receive the first message frame. In another embodiment, the receiver may be an access point connected to the sender and the device in the sleep state. In this case, the access point may receive the first message frame from the sender and then forward it to the device in the sleep state.

Referring to FIG. 4, in step 410, the first message frame is received on one link of the multiple links. The first message frame may include identification information for indicating that data is buffered for the device in the sleep state on at least one link of the multiple links. The Tunneled Direct Link Setup (TDLS) function is supported on the at least one link. The first message frame and the identification information contained therein may be similar to those in the embodiment described with reference to FIG. 3. For the purpose of simplicity, repeated description is omitted here.

According to an embodiment of the present disclosure, the identification information may include a PTI information element. The PTI information element may include: a basic service set identifier or link identification corresponding to each link of the at least one link, a transmission identifier, and sequence number control information. The transmission identifier may indicate a traffic buffered for the device in the sleep state on the respective link. The PTI information element here may be similar to that in the embodiment described with reference to Table 1. For the purpose of simplicity, repeated descriptions are omitted.

According to an embodiment of the present disclosure, the identification information includes a TPU information element. The TPU information element may include: a basic service set identifier or link identification corresponding to each link of the at least one link, and TPU buffer status information. The TPU buffer status information may indicate the buffer statuses of traffics of different access categories on the respective link. The TPU information element here may be similar to that in the embodiment described with reference to Table 2, and the TPU buffer status information may be similar to that in the embodiment described with reference to Table 3. For the purpose of simplicity, repeated descriptions are omitted.

According to an embodiment of the present disclosure, each basic service set identifier may indicate an identifier of the basic service set to which the access point on the respective link belongs. The basic service set identifier here may be similar to that in the embodiment described with reference to Table 1 and Table 2. For the purpose of simplicity, repeated descriptions are omitted.

With continued reference to FIG. 4, in step 420, a communication operation may be performed based on the first message frame. For example, when a receiver (for example, one or more devices in the sleep state wakes up) receives the first message frame, it may be determined whether data is buffered for it according to the identification information carried in the first message frame. If it is determined that data is buffered, the corresponding buffered data may be received.

The flowchart of the communication method shown in FIG. 4 is only provided as an example, and the present disclosure is not limited thereto. For example, according to an embodiment of the present disclosure, the communication method described in FIG. 4 may further include: receiving a second message frame; and/or sending a third message frame. At least one of the second message frame and the third message frame includes information identifying support for a multi-link communication.

For example, in the case where the receiver performing the communication method described in FIG. 4 is a TDLS responder, the communication method described in FIG. 4 may include receiving a second message frame. As a descriptive example only, the second message frame may be a TDLS discovery request frame. The embodiment regarding the second message frame may be similar to the embodiment described above with reference to FIG. 3, and repeated descriptions are omitted here to avoid redundancy.

For example, in the case where the receiver performing the communication method described in FIG. 4 is a TDLS responder, the communication method described in FIG. 4 may include sending a third message frame. As a descriptive example only, the third message frame may be a TDLS discovery response frame. The embodiment regarding the third message frame may be similar to the embodiment described above with reference to FIG. 3, and repeated descriptions are omitted here to avoid redundancy.

For example, in the case where the receiver performing the communication method described in FIG. 4 is a TDLS initiator, the communication method described in FIG. 4 may include receiving a second message frame. As a descriptive example only, the second message frame may be a TDLS discovery response frame. The embodiment regarding the second message frame may be similar to the embodiment described above with reference to FIG. 3, and repeated descriptions are omitted here to avoid redundancy.

For example, in the case where the receiver performing the communication method described in FIG. 4 is a TDLS initiator, the communication method described in FIG. 4 may include sending a third message frame. As a descriptive example only, the third message frame may be a TDLS discovery request frame. The embodiment regarding the third message frame may be similar to the embodiment described above with reference to FIG. 3, and repeated descriptions are omitted here to avoid redundancy.

Figure 5:
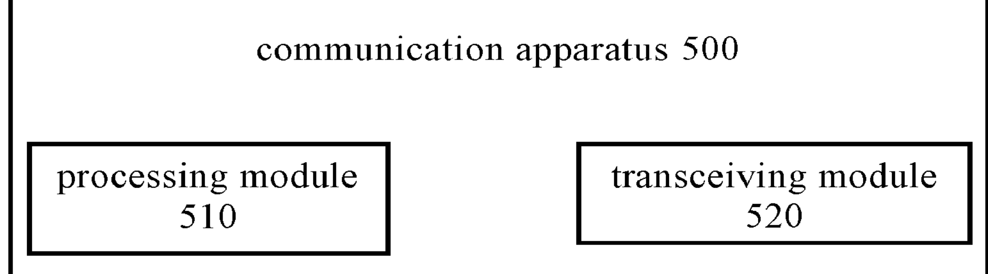
FIG. 5 shows a block diagram of a multi-link communication apparatus according to an embodiment.

FIG. 5 is a block diagram illustrating a communication apparatus 500 according to an embodiment of the present disclosure.

Referring to FIG. 5, the communication apparatus 500 may include a processing module 510 and a transceiving module 520. The communication apparatus shown in FIG. 5 may be applied to a sender or a receiver.

In the case where the communication apparatus shown in FIG. 5 is applied to the sender, the processing module 510 may be configured to determine the first message frame on one link of multiple links. The first message frame includes identification information for indicating that data is buffered for a device in a sleep state on at least one link of the multiple links. The Tunneled Direct Link Setup (TDLS) function is supported on the at least one link. The transceiving module 520 may be configured to send the first message frame. In this case, the communication apparatus 500 may perform the communication method described with reference to FIG. 3. For the purpose of simplicity, repeated description is omitted here.

When the communication apparatus shown in FIG. 5 is applied to the receiver, the transceiving module 520 may be configured to receive the first message frame on one link of multiple links. The first message frame includes identification information for indicating that the data is buffered for a device in a sleep state on at least one link of the multiple links. The Tunneled Direct Link Setup (TDLS) function is supported on the at least one link. The processing module 510 may be configured to control execution of a communication operation based on the first message frame. In this case, the communication apparatus 500 may perform the communication method described with reference to FIG. 4. For the sake of simplicity, repeated description is omitted here.

In addition, the communication apparatus 500 shown in FIG. 5 is only provided as an example, and embodiments of the present disclosure are not limited thereto. For example, the communication apparatus 500 may also include other modules, such as a memory module and the like. Furthermore, individual modules in the communication apparatus 500 may be combined into a more complex module, or may be divided into more individual sub-modules.

The communication method and the communication apparatus according to embodiments of the present disclosure help to save signaling, improve spectrum utilization, and enable the non-AP STA MLD that supports the TDLS mechanism in the PS state to support the TPU mechanism, thereby making the apparatus to be more power-saving.

Based on the same principle as the method provided by the embodiments of the present disclosure, the embodiments of the present disclosure also provide an electronic device. The electronic device includes a processor and a memory. The memory stores machine-readable instructions (which may be also referred to as a non-transitory "computer program"). The processor is used for executing machine-readable instructions to implement the methods described with reference to FIGS. 3 and 4.

Embodiments of the present disclosure also provide a non-transitory computer-readable storage medium having a computer program stored thereon. When the computer program is executed by a processor, the method described with reference to FIGS. 3 and 4 is implemented.

In example embodiments, the processor may be used to implement or execute various example logical blocks, modules, and circuits described in conjunction with the present disclosure, such as a Central Processing Unit (CPU), a general-purpose processor, Digital Signal Processor (DSP), Application Specific Integrated Circuit (ASIC), Field Programmable Gate Array (FPGA), or other programmable logic devices, transistor logic devices, hardware components, or any combination thereof. The processor may also be a combination that implements computing functions, such as a combination of one or more microprocessors, a combination of DSP and microprocessor, etc.

In example embodiments, the memory may be, for example, Read Only Memory (ROM), Random Access Memory (RAM), Electrically Erasable Programmable Read Only Memory (EEPROM), Compact Disc Read Only Memory (CD-ROM), or other optical disk storage, optical disc storage (including compressed optical discs, laser discs, optical discs, digital versatile discs, Blu-ray discs, etc.), magnetic disk storage media, or other magnetic storage device, or any other medium that may be used to carry or store program codes in the form of instructions or data structures that can be accessed by a computer, but is not limited thereto.

It should be understood that although various steps in the flowchart of the accompanying drawings are shown in sequence as indicated by arrows, these steps are not necessarily performed in the order indicated by arrows. Unless explicitly stated in the present disclosure, the execution of these steps is not strictly limited in order, and they may be executed in other orders. In addition, at least some of the steps in the flow chart of the accompanying drawings may include multiple sub-steps or multiple stages. These sub-steps or stages are not necessarily executed at the same time, but may be executed at different times. The execution order there of does not necessarily need to be performed sequentially, but may be performed in turn or alternately with other steps or sub-steps of other steps or at least part of the stages.

While the present disclosure has been shown and described with reference to certain embodiments thereof, those skilled in the art will understand that various changes may be made in form and detail without departing from the scope of the present disclosure. Therefore, the scope of the present disclosure should not be limited to the embodiments, but should be defined by the appended claims and their equivalents.

What is claimed is:

1. A multi-link communication method, comprising:

determining a first message frame on one link of multiple links, wherein the first message frame comprises identification information for indicating that data is buffered for a device in a sleep state on at least one link of the multiple links, and a Tunneled Direct Link Setup (TDLS) function is supported on the at least one link; and sending the first message frame, wherein the identification information comprises a TDLS Peer Unscheduled-Automatic Power Save Delivery (U-APSD) (TPU) information element, the TPU information element comprises: a basic service set identifier or link identification corresponding to each link of the at least one link, and TPU buffer status information, and the TPU buffer status information indicates buffer statuses for traffics of different access categories on a respective link.

2. The multi-link communication method according to claim 1, wherein the identification information further comprises a Peer Traffic Indication (PTI) information element;

the PTI information element comprises: a basic service set identifier or link identification corresponding to each link of the at least one link, a transmission identifier, and sequence number control information; and the transmission identifier indicates a traffic buffered for the device in the sleep state on a respective link.

3. The multi-link communication method according to claim 1, wherein each basic service set identifier indicates an identifier of a basic service set to which an access point on a respective link belongs.

4. The multi-link communication method according to claim 1, further comprising at least one of:

sending a second message frame; or receiving a third message frame, wherein at least one of the second message frame and the third message frame comprises information identifying support for a multi-link communication.

5. A multi-link communication method, comprising:

receiving a first message frame on one link of multiple links, wherein the first message frame comprises identification information for indicating that data is buffered for a device in a sleep state on at least one link of the multiple links, and a Tunneled Direct Link Setup (TDLS) function is supported on the at least one link; and performing a communication operation based on the first message frame, wherein the identification information comprises a TDLS Peer Unscheduled-Automatic Power Save Delivery (U-APSD) (TPU) information element, the TPU information element comprises: a basic service set identifier or link identification corresponding to each link of the at least one link, and TPU buffer status information, and the TPU buffer status information indicates buffer statuses for traffics of different access categories on a respective link.

6. The multi-link communication method according to claim 5, wherein the identification information further comprises a Peer Traffic Indication (PTI) information element, the PTI information element comprises: a basic service set identifier or link identification corresponding to each link of the at least one link, a transmission identifier, and sequence number control information, and the transmission identifier indicates a traffic buffered for the device in the sleep state on a respective link.

7. The multi-link communication method according to claim 5, wherein each basic service set identifier indicates an identifier of a basic service set to which an access point on a respective link belongs.

8. The multi-link communication method according to claim 5, further comprising at least one of:

receiving a second message frame; or sending a third message frame, wherein at least one of the second message frame and the third message frame comprises information identifying support for a multi-link communication.

9. An electronic device, comprising a memory, a processor, and a computer program stored on the memory and executable by the processor, wherein the processor is configured to, when executing the computer program, implement the multi-link communication method according to claim 5.

10. An electronic device, comprising a memory, a processor, and a computer program stored on the memory and executable by the processor, wherein the processor is configured to, when executing the computer program, implement a multi-link communication method, comprising:

determining a first message frame on one link of multiple links, wherein the first message frame comprises identification information for indicating that data is buffered for a device in a sleep state on at least one link of the multiple links, and a Tunneled Direct Link Setup (TDLS) function is supported on the at least one link; and sending the first message frame, wherein the identification information comprises a TDLS Peer Unscheduled-Automatic Power Save Delivery (U-APSD) (TPU) information element, the TPU information element comprises: a basic service set identifier or link identification corresponding to each link of the at least one link, and TPU buffer status information, and the TPU buffer status information indicates buffer statuses for traffics of different access categories on a respective link.

11. The electronic device according to claim 10, wherein the identification information further comprises a Peer Traffic Indication (PTI) information element;

the PTI information element comprises: a basic service set identifier or link identification corresponding to each link of the at least one link, a transmission identifier, and sequence number control information; and the transmission identifier indicates a traffic buffered for the device in the sleep state on a respective link.

12. The electronic device according to claim 10, wherein each basic service set identifier indicates an identifier of a basic service set to which an access point on a respective link belongs.

13. The electronic device according to claim 10, wherein the multi-link communication method further comprises at least one of:

sending a second message frame; or receiving a third message frame, wherein at least one of the second message frame and the third message frame comprises information identifying support for a multi-link communication.

* * * * *